April 11, 1961 — J. GAON — 2,979,628
PHOTO-ELECTRIC MONITOR FOR POINTER INDICATING INSTRUMENTS
Filed Feb. 9, 1959
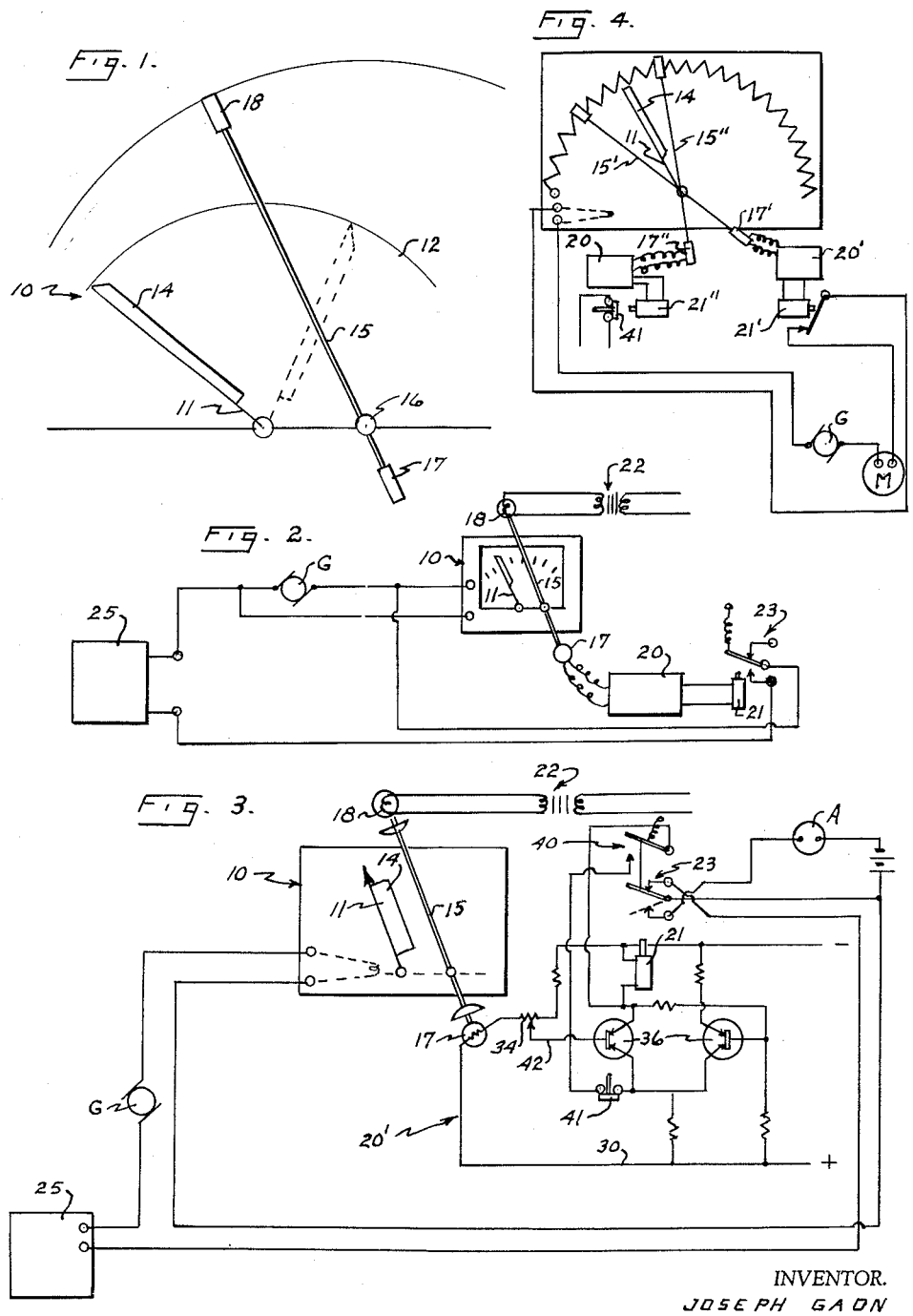
INVENTOR.
JOSEPH GAON
BY Howard J. Jeandron
AGENT United States Patent Office 2,979,628
Patented Apr. 11, 1961

2,979,628
PHOTO-ELECTRIC MONITOR FOR POINTER INDICATING INSTRUMENTS

Joseph Gaon, New York, N.Y., assignor to Heat Timer Corporation, New York, N.Y.

Filed Feb. 9, 1959, Ser. No. 792,027
7 Claims. (Cl. 307—96)

This invention relates to a photo-electric monitor that is to be used primarily with a pointer indicating instrument and more particularly to a monitor or controlling element such as a pivotally mounted pointer of an indicating instrument that is used to intercept the beam of light between a lamp and a photo-electric cell and in which the lamp and photo-electric cell are also pivotally supported to permit adjustment of the light beam to any position within the arc of the pointer.

Referring to the prior art, the interception of a light ray to a photo-electric cell by a pointer element is not new as shown in Patent No. 2,724,027, but in this instance the pointer is fixed, and the shield 86 is positioned to interrupt the light beam at a predetermined speed on the speedometer.

Likewise, the prior art illustrates a following and recording device shown in Patent No. 2,472,019, in which there is a primary indicator having angular movement and a follow-up element having angular movement and there is means for producing a beam of light which moves with the follow-up element and there is a vein on the primary indicator for variantly eclipsing the light beam in accordance with the relative angular position of the primary indicator and the follow-up element. In this patent, the primary indicator and the follow-up element are mounted to rotate on the same axis and instead of producing a monitoring effect, it is strictly a follow-up device.

It is an object of this invention to provide an electric circuit for monitoring controlled by a photo-electric element in which the photo-electric light and cell are mounted on a pivotally supported element, and in which an instrument such as a speedometer is provided and in which the pointer of this instrument is provided with a blade or shutter to intercept the light beam between the light source and the photo-electric cell.

Another object of this invention is to provide an electric circuit for monitoring controlled by a photo-electric element, in which the photo-electric light and cell are mounted on a pivotally supported element and in which an instrument such as a volt meter is provided, and in which the pointer of this instrument is provided with a blade or shutter to intercept the light beam between the light source and the photo-electric cell.

It is a further object of this invention to provide an electric circuit for monitoring, controlled by a photo-electric element in which the photo-electric light and cell are mounted on a pivotally supported element which is positioned off center from the instrument with which it is connected, and in which an instrument such as a speedometer is provided with a pointer that is concentrically pivotally mounted and is provided with a blade or shutter on the pointer to intercept the light beam to the photo-electric cell.

It is a further object of this invention to provide two electric circuits for monitoring, each controlled by a photo-electric element in which each photo-electric light and cell is mounted on a pivotally supported arm, and in which an instrument such as an r.p.m. meter is provided, and in which the pointer of this instrument is provided with a blade or shutter to intercept the light beam on either of the two pivotally supported arms.

Further objects of this invention shall be apparent by reference to the accompanying detailed description and the drawings, in which:

Fig. 1 is a front elevational view of the combination of an instrument with a photo-electric control;

Fig. 2 is a schematic wiring diagram;

Fig. 3 is a schematic wiring diagram of an alternate circuit, and

Fig. 4 is a further embodiment of this invention.

Referring to Fig. 1, there is illustrated an ammeter 10 that is provided with a pivotally supported pointer 11 that responds to variations in amperage in a circuit, the pointer 11 normally moving from the full line position indicated to another position across the dial 12, such as the dotted position illustrated. The pointer 11 is also provided with a shutter or blade 14; this is provided for but one purpose, and that is to intercept the path of a light beam. In addition to the pointer 11, there is provided a pivotally mounted arm 15 with the pivotal point 16 eccentric to the ammeter. It may be on the same horizontal axis, but spaced a chosen distance from the concentric pointer mounting. The arm 15 is provided with a photo-electric cell 17, mounted on one side of the pivotal center, while a light or lamp 18 is mounted at the opposite end of the arm with the light beam directed to the photo-electric cell 17. The ammeter 10 is only by way of example; it may similarly be a volt meter, ohmmeter, r.p.m. meter, speedometer, etc. The horizontal spacing between the pivotal center of the meter and the pivotal mounting of the arm 15 is entirely arbitrary.

Referring next to a typical wiring diagram in Fig. 2, in the event the device is to be used to cut out the circuit whenever the generator provides an amperage above a predetermined amount, an ammeter 10 is provided and the arm 15 is mounted in the same relation to the pointer 11 as already described in Fig. 1. The photo-electric cell 17 is connected through a circuit 20 to a relay 21 and through its plus and minus leads to a source of energy. Thus, as long as the lamp 18 is illuminated by a circuit 22, the light beam will energize cell 17 and relay 21 will be energized, closing the circuit through the generator G and in this instance operating a device 25 that is in turn connected in series in this circuit. When the generator G produces a greater amperage than desired for the device 25, the ammeter will record the increase in amperage and pointer 11 will move clockwise until the blade on pointer 11 cuts the light beam to the photo-electric cell 17, thus de-energizing cell 17 and in turn de-energizing relay 21 and thus switch 23 will be opened and the circuit through the device 25 will also be broken. As soon as the circuit is broken and the blade 11 in ammeter 10 falls back, the photo cell 17 will be reenergized, switch 23 will again close and the circuit through the device 25 will again be completed. A similar type of circuit may be utilized where a volt meter or ohmmeter is to be used, or the r.p.m. meter may be connected to a motor and in the same manner the movement of the pointer with a blade or shutter thereon will intercept the light beam to thus break the circuit and reduce the r.p.m. of the motor, thus dropping the pointer 11 back again and allowing the circuit to re-energize and thus re-energize the motor being controlled.

Referring to Fig. 3, there is illustrated an alternate wiring diagram. In this instance, the ammeter 10 is utilized to monitor the current variation, which will vary as the load on the device varies. With the arm 15 set at a desired position (the maximum amperage) and with the pointer 11 provided with a shutter blade 14, it is apparent that when the ammeter registers a current of sufficient amplitude to cause pointer 11 and blade 14 to intercept the light beam that is normally projected from the lamp 18 to the photo cell 17, along arm 15, there will be an interruption of this light beam and an interruption of the circuit energized by photo cell 17. The de-energization of the photo cell 17 will in turn energize relay 21. When relay 21 is energized it will control switches 23 and 40. Switch 23 when pulled down will de-energize the monitored device 25 and it will also energize an alarm "A." Relay 21 will latch in, in other words, remain energized through switch 40 and the reset switch 41. Relay 21 will remain energized until the reset switch 41 is depressed to break the circuit. This breaking of the continuity of the circuit will release relay 21 to its normal de-energized position. At the same time the alarm will be de-energized and the monitored device 25 will then be re-energized and the instrument will resume the monitoring control. The circuit 20' that is connected to the photo cell 17 is known as the Schmitt Trigger. This is used primarily to cause a snap action of the relay 21. The reason for using this Schmitt Trigger is due to the effect of the variance of resistance on cell 17 as the shutter 14 effects the light beam through light 18 to cell 17. This variance in resistance is handled by the transistors 36 in the Schmitt Trigger circuit. The photo cell 17 is part of a voltage divider. When the voltage through the variable resistance 34 through line 42 to the transistor 36 reaches a certain preset level, the Schmitt Trigger circuit then provides the necessary voltage to energize relay 21. Resistors are inserted in the various leads as required. Thus with this circuit photo cell 17 is properly controlled with a sensitive circuit that will respond to the light energization from light source 18, and circuit 20' will provide sufficient amplitude to operate relay 21 as long as photo cell 17 is energized.

A further embodiment of this invention is illustrated in Fig. 4, in which a similar measuring instrument may be utilized; for example, a speedometer, and in this embodiment two arms, 15' and 15", are provided and are pivotally mounted at the concentric center of the instrument. Each arm similarly holds a light or lamp at one end and a photo-electric cell at the opposite end. In this instance, one arm is set for a minimum or predetermined speed, while the other arm is set for a maximum predetermined speed. Thus, with two settings, we may control the r.p.m. of a motor M. The circuit from arm 15' will be as in Fig. 3 to maintain the operation of the motor, while the second setting under the control of arm 15" will prevent the motor M from operating at an r.p.m. above the setting of arm 15". It is apparent that a circuit 20' similar to that illustrated in Fig. 3 may be provided for the photo cell 17' to thus control the operation of a relay 21'. To control the r.p.m. of a motor that is using 15' for a setting of the minimum r.p.m. and using 15" for a setting for maximum r.p.m. and starting up the motor, pointer 11 will move to indicate the r.p.m. of the motor. If pointer 11 is provided with a blade 14, as in the prior embodiment, as soon as blade 14 intercepts the light beam on arm 15" relay 21" will open the reset switch 41, cutting out the circuit to the motor; thus, the motor r.p.m. will drop and as soon as pointer 11 moves to the position of arm 15', blade 14 will intercept the light source to cell 17', de-energizing the photo cell, which in this instance triggers and energizes relay 21', which closes the motor circuit to prevent the r.p.m. dropping below the minimum setting of arm 15', thus the motor will continue to operate at an r.p.m. between the maximum and minimum setting according to arms 15' and 15".

Although the photo-electric monitoring control illustrated has been described in conjunction with an ammeter to control the amperage in a circuit, it is apparent that it may be similarly applied to a volt meter to control the voltage, or it may be applied to an r.p.m. meter to control the r.p.m., or it may be used with an ohmmeter or any other meter of a similar nature, without departing from the spirit of this invention, and although the photo-electric control is pivotally mounted in a parallel relation, or offset with relation to the pivotal mounting of the instrument pointer, the photo-electric control may be varied in its position to any eccentric position or to a concentric position, without departing from the spirit of this invention, and also the photo-electric pivotal control may consist of two such elements to permit a minimum and maximum setting, without departing from the spirit of this invention, and this invention shall be limited only by the appended claims.

What is claimed is:

1. A monitoring circuit for an electrically operated device, which includes a pivotally operated pointer of an instrument, said pointer provided with a blade mounted parallel to and along said pointer, a pivotally supported arm carrying a lamp at one end and a photo-electric cell at the opposite end, the light beam from said lamp being directed to said photo-electric cell to maintain it energized, said pivotally supported arm being mounted on a pivot that is eccentric to said instrument pointer pivot but within the span of said pointer, said arm settable to remain in any position within the sweep of said instrument pointer, said lamp connected to a source of energy to maintain it illuminated, said photo-electric cell connected to a circuit that includes a relay and a battery, said photo-electric cell and said relay energized as long as the light beam from said lamp impinges on said photo cell, a switch that is closed by said relay, said switch connected to a source of energy and the device that is being monitored, said relay when energized closing said switch to in turn close said circuit to said device, said device being connected to said pointer indicating instrument, said pointer and blade movable in response to said device, means to interrupt the energy to drive said device when the pointer instrument indicates the device is exceeding a predetermined setting, and means to renew the energy to said device when the pointer instrument indicates the device has been reduced below the predetermined setting.

2. In a device according to claim 1, in which the device being monitored is an electrically driven speedometer and the pointer of the speedometer is provided with said blade and in which the pivotally supported photo-cell carrying arm is mounted to the speedometer in the same eccentric relationship.

3. In a device according to claim 1, in which the device being monitored is an electrically driven ammeter and the pointer of the ammeter is provided with said blade and in which the pivotally supported photo-cell carrying arm is mounted to the ammeter in the same eccentric relationship.

4. In a device according to claim 1, in which the device being monitored is an electrically driven voltmeter and the pointer of the voltmeter is provided with said blade and in which the pivotally supported photo-cell carrying arm is mounted to the voltmeter in the same eccentric relationship.

5. A monitoring circuit for an electrically operated device to monitor the current variation which will vary as the load on the device varies, which includes a pivotally operated pointer of an ammeter, said pointer provided with a blade mounted parallel to and along said pointer, a pivotally supported arm carrying a lamp at one end and a photo electric cell at the opposite end, the light beam from said lamp being directed to said photo cell to maintain it energized, said pivotally supported arm being mounted on a pivot that is eccentric to said ammeter pointer pivot but within the span of said pointer, said arm settable to remain in any position within the sweep of said ammeter pointer, said lamp connected to a source of energy to maintain it illuminated, said photo cell connected to a circuit that is commonly known as the "Schmitt Trigger," this circuit including a relay and source of energy and providing a snap action for said relay, said photo cell energized as long as the light beam from said lamp impinges on said photo cell, said circuit acting as a voltage divider; with the photo cell energized the trigger action on said relay will be reserved, a switch that is controlled by said relay, said switch normally connected to a generator, the device that is being monitored, and the ammeter, means to intercept said light beam with said ammeter pointer and blade when said generator produces a greater amperage than desired for said device, means to trigger said circuit when said light beam is intercepted by de-energizing said photo cell and energizing said relay, means to interrupt said circuit to said device until said ammeter registers a drop in amperage below the desired amount, and means to renew said circuit to said device after said amperage has dropped below the predetermined setting.

6. In a device according to claim 5, in which the ammeter may be replaced by a voltmeter and in which the voltage to the voltmeter will be monitored.

7. In a device according to claim 5, in which the Trigger circuit is provided with an alarm to indicate the excess amperage and a reset switch to permit resetting the Trigger circuit.

References Cited in the file of this patent

UNITED STATES PATENTS

| | | |
|---|---|---|
| Re. 20,476 | Wilson et al. | Aug. 17, 1937 |
| 2,236,255 | Young | Mar. 25, 1941 |
| 2,521,479 | Rautter | Sept. 5, 1950 |
| 2,765,986 | Pompetti et al. | Oct. 9, 1956 |